United States Patent
Kilmer

[19]

[11] Patent Number: 6,057,527
[45] Date of Patent: May 2, 2000

[54] PORTABLE ELECTRIC DESOLDERING TOOL

[75] Inventor: Paul R. Kilmer, Leroy, Mich.

[73] Assignee: Cooper Technologies Company, Houston, Tex.

[21] Appl. No.: 09/100,976

[22] Filed: Jun. 22, 1998

[51] Int. Cl.[7] ....................................... H05B 1/00
[52] U.S. Cl. ..................... 219/227; 219/230; 228/20.5
[58] Field of Search ................................ 219/227, 230; 228/20.1, 20.5

[56] References Cited

U.S. PATENT DOCUMENTS 5,857,609  1/1999  Jacks ........................................ 228/20.5

*Primary Examiner*—Teresa Walberg
*Assistant Examiner*—Vinod Patel
*Attorney, Agent, or Firm*—Coats & Bennett, P.L.L.C.

[57] ABSTRACT

The present invention is directed to a self-contained desoldering gun having a built-in vacuum pump. The vacuum pump is operated by a low voltage electric motor which is electrically connected in at least partial series with a heating tip. According to an exemplary embodiment of the invention a full wave bridge rectifier is used to supply power to the vacuum pump motor and a built-in vacuum pump while using a half-wave bridge rectifier to supply power to the heater. In exemplary embodiments, the vacuum pump is provided for drawing molten solder and when a trigger is activated the motor is subsequently energized and the output of the heating tip is increased.

20 Claims, 4 Drawing Sheets

PORTABLE ELECTRIC DESOLDERING TOOL

BACKGROUND

This invention relates to desoldering tools in general, and in particular to a desoldering tool with improved power control.

Currently most desoldering in the electronics trade is performed with desoldering systems which consist of an electrical power base and desoldering handpiece. The base typically includes a pump and a transformer and is connected to the desoldering handpiece by an electric cord and a vacuum tube. The base sits on an electronics workbench and the operator holds the desoldering handpiece while working.

An electrical desoldering tool can perform any number of functions. For example, the tool can be used to generate heat at a tip which is applied to circuit board components to melt the bonding solder that holds various components to the board. The tool can also supply a vacuum to draw the molten solder into a reservoir, for example, in the handpiece.

Present desoldering devices are often cumbersome. For example, they require an electric cord to be attached to the gun to energize the heating element. In addition, a vacuum hose must be attached to the gun to remove the melted solder from the circuit board. Both of these appendages must be dragged around by the operator making operation of the desoldering difficult, even for experienced operators. This arrangement further requires that the vacuum pump and transformer be mounted on a bench in the vicinity of the desoldering operation.

The principal disadvantage of the above described arrangement is the lack of mobility and portability as a result of the handpiece being attached to the base by an electrical cord and pneumatic tube. Therefore, according to this arrangement, the operator may only move about 4 to 5 feet from the base. In addition, the nature of the cord and tube make the operation of the device unwieldy.

One method that has been used in an attempt to overcome some of the problems associated with these earlier systems was to manufacture a self contained desoldering gun placing a vacuum pump in the handle of the desoldering gun. According to this arrangement the need for a pneumatic tube connected to the base is eliminated. However, the motors typically used to power the vacuum pump were operated with line voltage motors, which are large and heavy. In addition, these AC electric motors operate at 100 or 120 volts and required significant insulation adding further to the considerable weight of the devices. Consequently, the portable tool itself became large, heavy, and difficult to handle by the operator, especially over extended periods of time.

Another method of manufacturing a self contained desoldering gun provided an improvement over these earlier portable desoldering guns by operating the built-in vacuum pump with a low voltage DC electric motor that is electrically connected in at least partial series with a heating tip. According to this arrangement the heating tip reduces the voltage in the circuit. Subsequently, the size of the motor required to operate the pump and the overall weight of the desoldering gun was reduced. The reduced weight allowed the gun to be more easily handled by operators.

An example of a desoldering gun embodying this arrangement is shown in FIG. 1. Turning to FIG. 1 desoldering gun is referred to in general by numeral 10 and contains the major components of a tip 20, vacuum pump 40, and low voltage DC motor 50. The low voltage DC motor 50 located in the handle of the desoldering gun operates a gun mounted vacuum pump 40. AC line voltage is received through cord 42.

FIG. 2 shows an exemplary circuit diagram corresponding to the desoldering gun of FIG. 1. According to this arrangement, AC line voltage 32 is converted to DC current by rectifier 36 and is reduced in voltage by placing a heating element 34 of the desoldering gun in partial series with the pump motor 50. A portion of the heating element 34 which is not in series with the pump motor 50 is in parallel with the pump motor 50 when the pump motor is energized. Switch 38 is a trigger switch (see FIG. 1) used to energize motor 50 via the series arrangement of switch 38 and motor 50 as shown in FIG. 2.

While this embodiment provided a major improvement over prior desoldering guns, the desoldering gun can be susceptible to electromagnetic interference (EMI) and radio frequency interference (RFI). This arrangement can also result in decreased power associated with use of the motor during operation of the vacuum pump.

SUMMARY

It is an object of the present invention to provide an improved desoldering device with better power control resulting in increased power from the motor. It is a further object of the invention to provide a desoldering device that is less susceptible to EMI and RFI during use in the work environment. It is another object of the invention to provide a desoldering device with overall more efficient power consumption than previous desoldering devices.

This and other objects are provided in a desoldering gun including a low voltage DC vacuum pump motor, heater, and power supply. According to an exemplary embodiment of the invention a full wave bridge rectifier is used to supply power to the vacuum pump motor and a built-in vacuum pump while using a half-wave bridge rectifier to supply power to the heater.

BRIEF DESCRIPTION OF THE DRAWINGS

Other objects and advantages of the invention will be apparent to those skilled in the art upon reading the following detailed description in conjunction with the accompanying drawings, wherein.

DETAILED DESCRIPTION

Figure 1:
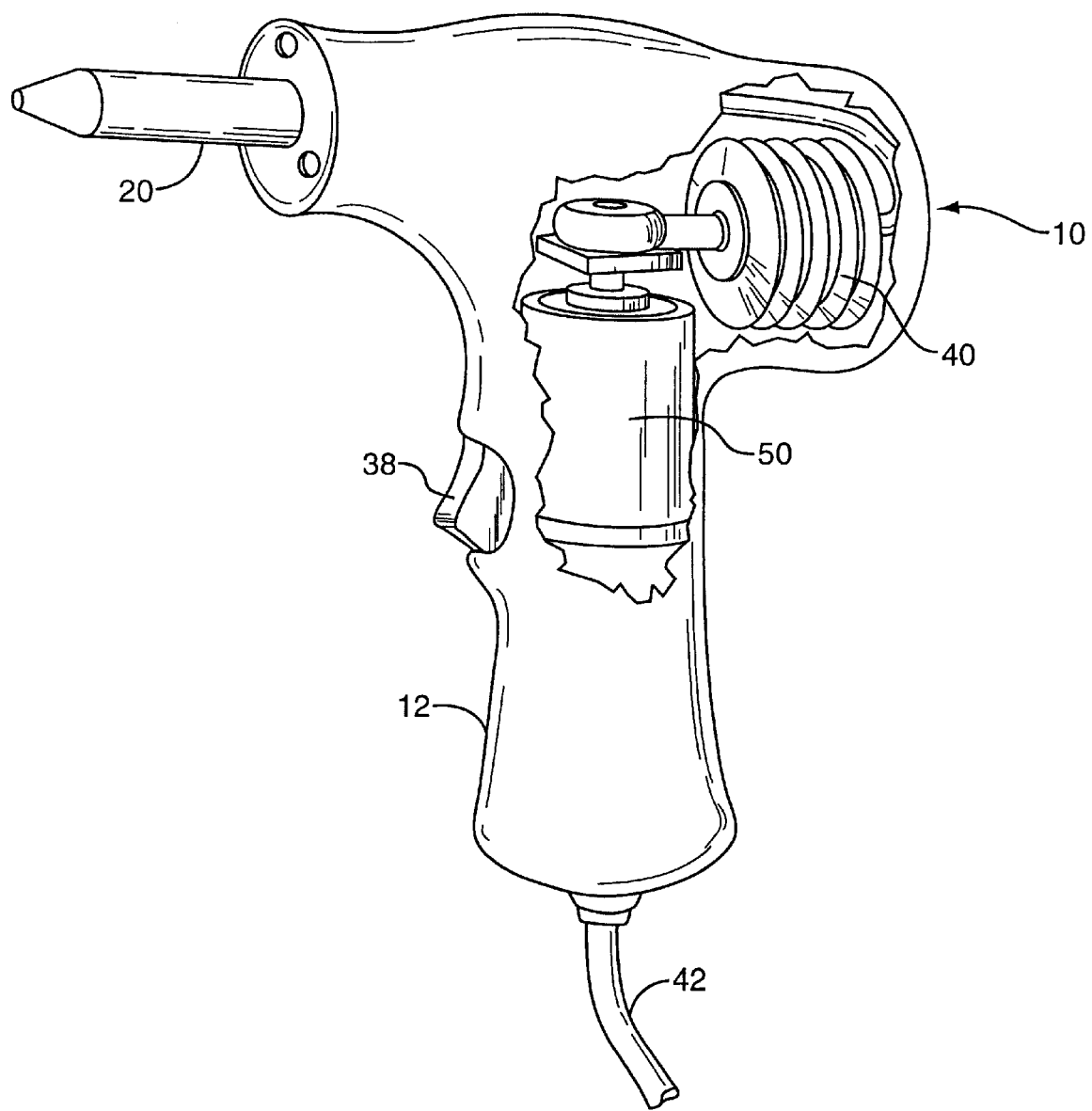
FIG. 1 is a perspective view, partly in section of a desoldering gun.
Figure 2:
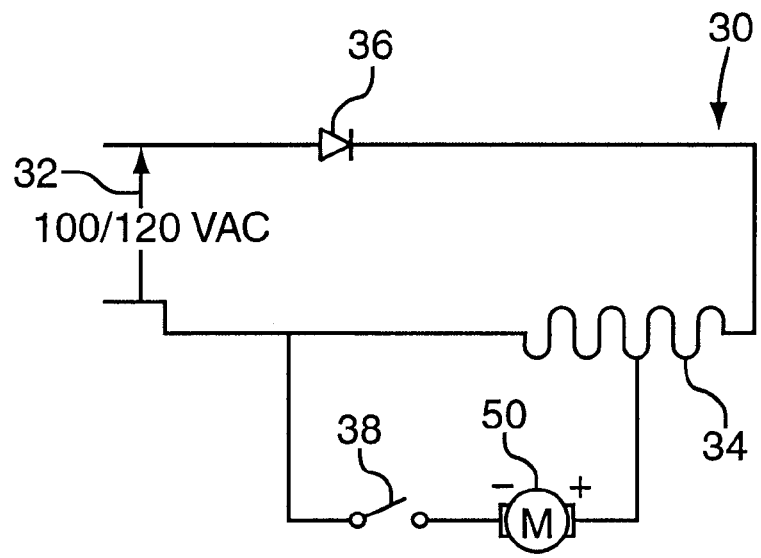
FIG. 2 is a schematic view of a desoldering gun circuit with built-in vacuum pump motor.

The present invention can be further understood with reference to the following description and the appended drawings, wherein like elements are provided with the same reference numerals.

Figure 3:
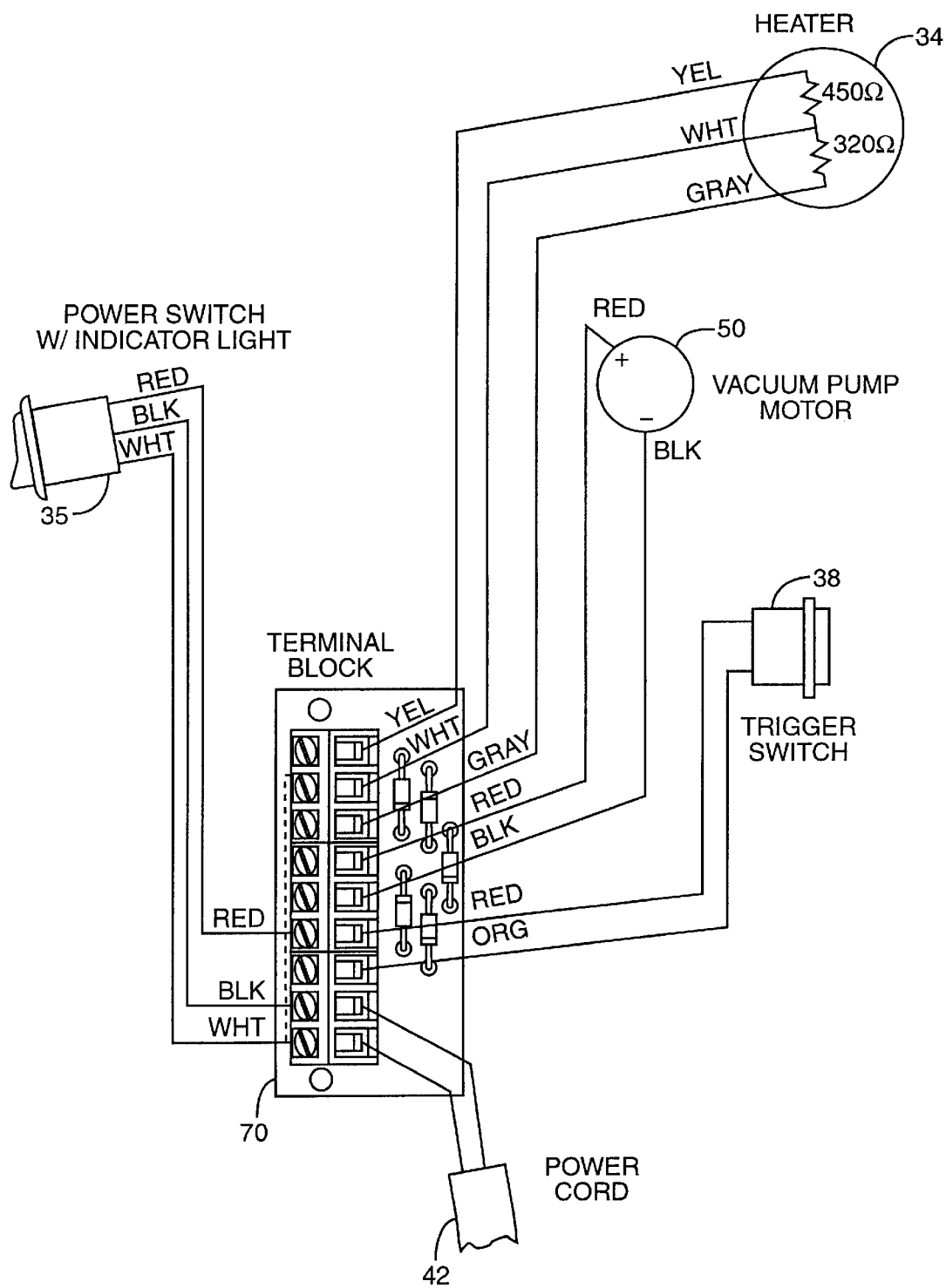
FIG. 3 is a schematic view of a desoldering gun circuit according to an exemplary embodiment of the present invention.

Turning to FIG. 3, a desoldering gun according to an exemplary embodiment of the present invention is referred to in general by numeral 10. Major components of desoldering gun 10 are heater 34, vacuum pump motor 50, and power supply 33. According to an exemplary embodiment, the motor may be a low voltage DC motor 50, operating a gun mounted vacuum pump (not shown). An AC line voltage is received through cord 42. A terminal block 70 is used to convert the AC voltage to DC voltage for the DC motor 50 and to connect the heater 34 to the power supply 33. In addition two switches, a power switch 35 and a trigger switch 38 are connected to the terminal block to provide the user control over the operation of the gun 10. According to an exemplary embodiment, the heater 34, vacuum pump motor 50, and power switch 35 may be located in the upper portion or "barrel" of the gun, while terminal block 70 and trigger switch 38 may be placed in the handle.

Figure 4:
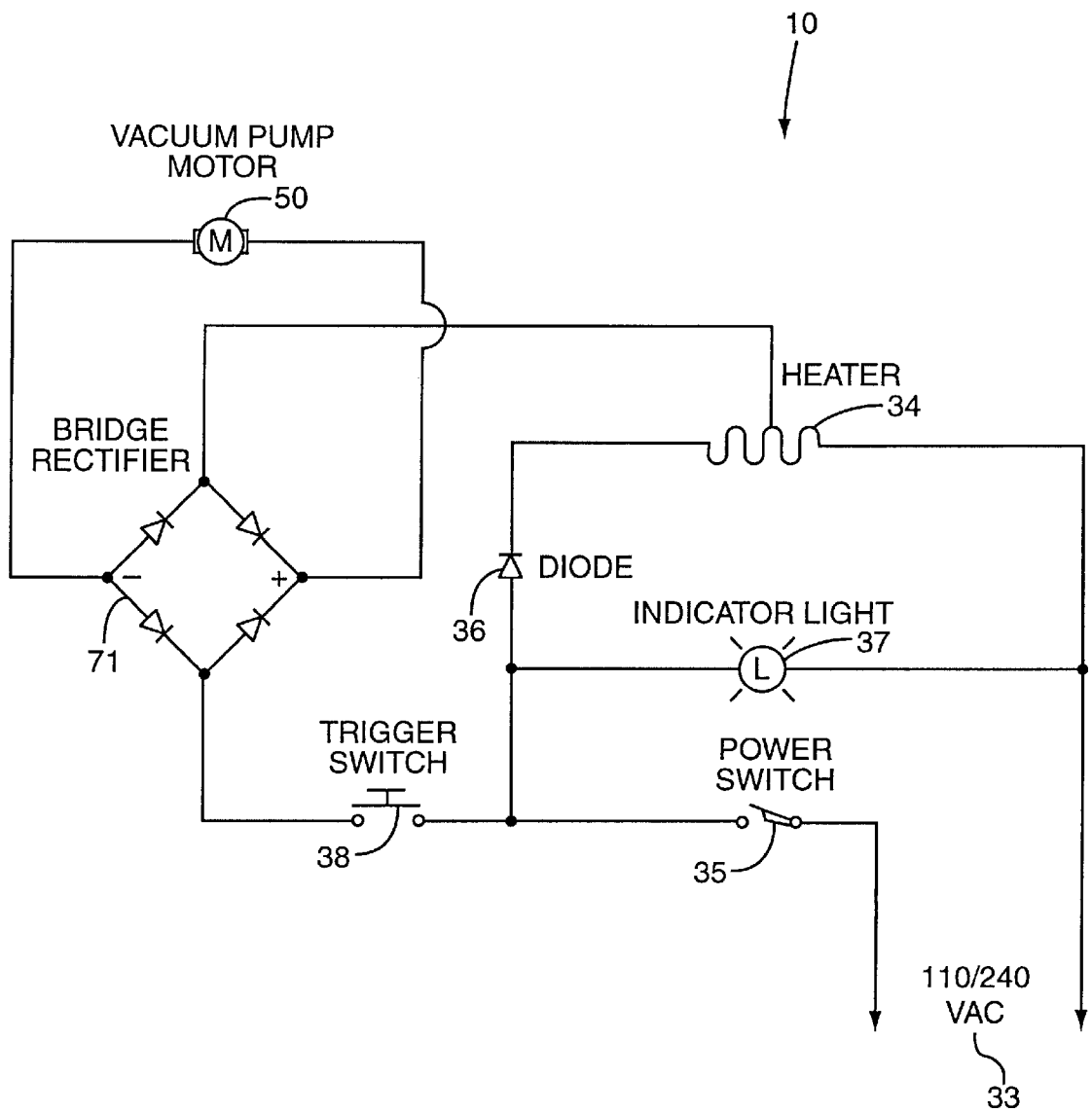
FIG. 4 is a schematic view of the wiring of a desoldering gun according to an exemplary embodiment of the present invention.

FIG. 4 illustrates an exemplary circuit diagram of the desoldering gun according to the embodiment shown in FIG. 3. According to this exemplary embodiment the desoldering gun is provided with a heater element 34. The heater 34 may be formed by a multi-layer winding located in the tip of the desoldering gun. The multi-layer winding and tip that may be used with the present invention are described in detail in copending application Ser. No. 08/926,801 filed Sep. 9, 1997 entitled "Portable Electronic Desoldering Tool" and hereby expressly incorporated by reference.

AC line voltage 33 (e.g., 110/240 VAC) is supplied to the power switch 35. The AC current is converted to DC current by a half-wave bridge rectifier comprising diode 36. The half-wave bridge rectifier is connected in series with the heater 34 at all times the desoldering gun is powered on allowing the heater 34 to operate at half of the line voltage level. This arrangement has several advantages over previous desoldering devices, such as, reducing the number of windings required in the heater, reducing resistances of the heater, and reducing the physical size of the heater.

When the power switch 35 is activated by the operator the heater is energized and heats up. The diode 36 is used to run the heater at all times at low heat (e.g., 60 volts). Through use of the half-wave bridge rectifier for supplying power to the heater, the diode 36 decreases the voltage of the heater 34 during the idle mode, when only stand-by heat is required from the heater 34, providing an output of, for example, 23 watts. In this mode the heater's temperature is high enough to melt the solder (e.g., 700 degrees Fahrenheit).

Also provided in parallel with the heater is an indicator lamp 37 allowing the operator to know when the heating tip has been energized. According to one embodiment the power-on indicator lamp 37 may be integrated in the power switch itself.

Also shown in FIG. 4, is the low voltage vacuum pump motor 50. AC line voltage 33 is converted to DC current by the full-wave bridge rectifier 71. The DC pump motor 50 is also connected in partial series with the heating element 34 of the desoldering gun. A portion of the heating element 34 which is not in series with the pump motor 50 is in parallel with the pump motor 50 when the pump motor is energized. Switch 38 is a trigger switch used to energize motor 50 via the series arrangement of switch 38 and motor 50 as shown in FIG. 4.

The present invention solves the problems associated with operating a heavy hand held tool and yields a substantial cost savings. The invention utilizes a low voltage motor 50, for example, a 24 volt DC motor in a preferred embodiment. According to this embodiment the motor would include a varistor and 3 disc capacitors. The low voltage motor is used without a transformer which reduces weight of the desoldering gun. This is achieved by utilizing the full-wave bridge rectifier 71 to convert the current to DC, and a heater element 34 as part of the voltage drop (IR drop) which reduces the line voltage 32 to the amount required by the DC motor 50. The voltage drop creates heat which is used in the desoldering process.

While an AC motor without the rectifier could be used, there are several advantages of using a low voltage motor. Low voltage DC motors are substantially less expensive than line voltage AC motors. Low voltage DC motors are also smaller in size than line voltage AC motors, and hence, yield a smaller and easier-to-handle tool. Low voltage DC motors are also lighter in weight than line voltage AC motors, yielding a lighter desoldering tool and reducing operation fatigue. Furthermore, DC permanent magnet motors operate with more power and are more efficient than their AC counterparts.

According to the exemplary embodiment of the invention shown in FIG. 4, the motor 50 is arranged with a "center" tap of heater 34. This arrangement operates to prevent cooling of the desoldering tip 20. When the desoldering device is being used to melt the solder, only the half bridge rectifier is used to power heater 34 at an output of 23 watts, as described above, for example. However, when the trigger 38 is activated upon reflow of the solder and the subsequent energizing of the vacuum pump motor 50, the motor decreases its resistance since less coils are drawn on; as a result, the heater coils gets hotter, and the output of the coil is increased (e.g., to 45–50 watts). Therefore, the present invention is much more efficient than previous desoldering devices where the heater operated at wattage of approximately 150 watts or more when the motor was running.

When the desoldering tip touches a component or circuit board, the temperature of the tip will drop as a result of the heat sinking capacities of the component on the printed circuit board. The drop in temperature can hinder reflowing the solder and the success of the desoldering operation. A further complication arises when the vacuum pump is energized and draws cool air over the molten solder. This drops the temperature further. However, the present invention's use of a center tap arrangement gives a thermal boost at the time of vacuum pump activation. This assists in maintaining the reflow of the molten solder and prevents further temperature drops of the heating tip.

Other advantages of the present invention's design result from the use of a full-wave bridge rectifier to operated the motor and the half-wave rectifier to operate the heating heater. This arrangement results in increased power output from the motor due to an elimination of the pulsating of the motor. Another advantage of using the half wave rectifier to supply power to the heater is the resulting decrease in voltage required allowing the heater to run at a low output when the vacuum pump motor is not running and decreases the number of winding on the heater. Furthermore, use of the two separate rectifiers also decreases the susceptibility of the desoldering device to RFI and EMI interferences.

Of course, those skilled in the art will appreciate that the foregoing exemplary embodiments are by way of illustration only, and that numerous variants exist. For example, exemplary embodiments can be powered at 120 or 220 AC supply volts by changing the heater resistance to match the higher voltages; however, the voltage motor could remain the same.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range and equivalence thereof are intended to be embraced therein.

What is claimed is:

1. An electronic desoldering gun comprising:
   a power switch;
   a heating tip;
   a first rectifier arranged in series with the heating tip;
   an electric motor connected to a vacuum pump;
   at least a portion of said heating tip is electrically connected in series with said motor; and
   a second rectifier arranged in series with the electric motor;
   wherein, when the power switch is on electricity is supplied to the heating tip through the first rectifier, regardless of whether power is supplied to the electric motor.

2. A desoldering gun as in claim 1, wherein said motor is a DC motor.

3. A desoldering gun as in claim 1, wherein said power switch includes an integrated power indicator lamp.

4. A desoldering gun as in claim 1, further comprising a trigger switch, wherein when said trigger switch is activated power is supplied to said motor.

5. A desoldering gun as in claim 1, wherein said vacuum pump is provided for drawing molten solder during operation of said heating tip.

6. A desoldering gun as in claim 1, wherein said first rectifier is a half wave rectifier and said second rectifier is a full-wave bridge rectifier.

7. A desoldering gun as in claim 4, wherein said vacuum pump is provided for drawing molten solder and when the trigger is activated upon reflow of the solder and the subsequent energizing of said motor, the output of said heating tip is increased.

8. A desoldering gun as in claim 4, wherein said heating tip output is approximately 24 watts.

9. A desoldering gun as in claim 8, wherein said heating tip increases to approximately 40–50 watts upon activation of said motor.

10. A desoldering gun as in claim 8, wherein said first rectifier is a half wave rectifier and said second rectifier is a full-wave bridge rectifier.

11. An desoldering gun as in claim 8, wherein said heating tip comprises a multi-layer winding.

12. An electronic desoldering gun comprising:
    a heating tip;
    a first rectifier arranged in series with the heating tip;
    a first switch for controlling electricity to the heating tip through the first rectifier;
    an electric motor connected to a vacuum pump;
    at least a portion of said heating tip is electrically connected in series with said motor;
    a second rectifier arranged in series with the electric motor; and
    a second switch for controlling electricity to the electric motor.

13. A desoldering gun as in claim 12, wherein said motor is a DC motor.

14. A desoldering gun as in claim 12, wherein said first switch includes an integrated power indicator lamp.

15. A desoldering gun as in claim 12, wherein said vacuum pump is provided for drawing molten solder during operation of said heating tip.

16. A desoldering gun as in claim 12, wherein said vacuum pump is provided for drawing molten solder and when the second switch is activated upon reflow of the solder and the subsequent energizing of said motor, the output of said heating tip is increased.

17. A desoldering gun as in claim 12, wherein said heating tip output is approximately 24 watts.

18. A desoldering gun as in claim 12, wherein said heating tip increases to approximately 40–50 watts upon activation of said motor.

19. A desoldering gun as in claim 12, wherein first rectifier is a half wave rectifier and said second rectifier is a full-wave bridge rectifier.

20. An desoldering gun as in claim 12, wherein said heating tip comprises a multi-layer winding.

\* \* \* \* \*